United States Patent [19]

Takakura et al.

[11] Patent Number: 5,335,765
[45] Date of Patent: Aug. 9, 1994

[54] WET-TYPE FRICTION MEMBER WITH GROOVES SHAPED FOR IMPROVED OIL FILM REMOVING EFFECT

[75] Inventors: Norio Takakura; Jin Takahashi, both of Chitose, Japan

[73] Assignee: Dynax Corporation, Hokkaido, Japan

[21] Appl. No.: 9,452

[22] Filed: Jan. 27, 1993

[30] Foreign Application Priority Data

Jan. 31, 1992 [JP] Japan .............. 4-009133[U]
Dec. 15, 1992 [JP] Japan .............. 4-091109[U]

[51] Int. Cl.⁵ .............. F16D 69/00; F16D 13/64
[52] U.S. Cl. .............. 192/107 R; 192/70.12; 192/113.36
[58] Field of Search .............. 192/107 R, 70.12, 70.14, 192/113 BG

[56] References Cited

U.S. PATENT DOCUMENTS

| | | | |
|---|---|---|---|
| 762,622 | 6/1904 | Eastwood | 192/107 R |
| 1,936,240 | 11/1933 | Lane | 192/107 R |
| 3,048,250 | 8/1962 | Kershner | 192/107 R |
| 3,063,531 | 11/1962 | Auschauer | 192/107 R |
| 3,476,228 | 11/1969 | Pritchard | 192/107 R |
| 3,972,400 | 8/1976 | Howells | 192/107 R |
| 4,139,085 | 2/1979 | Kanbe et al. | 192/107 R |
| 4,260,047 | 4/1981 | Nels | 192/107 R X |
| 4,287,978 | 9/1981 | Staub, Jr. | 192/113 BG |
| 4,396,100 | 8/1983 | Eltze | 192/113 BG X |
| 4,726,455 | 2/1988 | East | 192/107 R |
| 5,094,331 | 3/1992 | Fujimoto et al. | 192/113 BG X |
| 5,101,953 | 4/1992 | Payvar | 192/107 R |
| 5,176,236 | 1/1993 | Ghidorzi et al. | 192/107 R |

*Primary Examiner*—Leslie A. Braun
*Assistant Examiner*—Andrea Pitts
*Attorney, Agent, or Firm*—Howson & Howson

[57] ABSTRACT

Wet-type friction members in an automatic transmission are provided with sets of grooves which diverge from each other, or with grooves which increase in width as they approach an edge of the frictional surface and which are rearwardly inclined in relation to the direction of rotation of the member which engages the grooved frictional surface. The grooves facilitate the removal of the oil film which is formed on the frictional surface, and thereby improves torque transmission and speeds engagement. In addition, the presence of the specially configured grooves causes the coefficient of friction to decrease gradually as relative rotational speed decreases, and avoids a sudden increase in the coefficient of friction as engagement is completed.

7 Claims, 9 Drawing Sheets

FIG. 8b subject invention

PRIOR ART

WET-TYPE FRICTION MEMBER WITH GROOVES SHAPED FOR IMPROVED OIL FILM REMOVING EFFECT

BRIEF SUMMARY OF THE INVENTION

This invention relates to friction members and particularly to improvements in wet-type friction members of the kind used in automotive automatic transmissions.

Friction members used in an automatic transmission include the friction disks of a multiple disk clutch, a brake band, and a lockup mechanism. In the multiple disk clutch, the friction engagement surfaces of the disks are typically provided with radial grooves, and the brake band is provided with circumferential grooves. An important function of the grooves is to remove the oil film present between the friction member and the mating member. The presence of the oil film at the time of frictional engagement results in a lowered coefficient of friction, a consequent decrease in the transmission torque until the oil film is removed, and the prolongation of the time required for completion of engagement of the friction elements and their mating elements.

It is therefore an object of the invention to provide a wet-type friction member in which the oil film is more rapidly and effectively removed from the friction surface. In accordance with the invention, it has been discovered that specially configured grooves, provided in the friction engagement surfaces of disk-type and band-type friction members, are highly effective in removing the oil film and prevent the lowering of the coefficient of friction, the decrease in torque, and the prolongation of the time required for complete engagement. The effectiveness of the invention is confirmed by tests conducted on various shapes of grooves.

In accordance with one embodiment of the invention applicable to a disk-type friction engaging member, grooves formed in the friction engagement surface include a first set of grooves, each groove of the first set extending at an angle in relation to the radial direction, and obliquely backwardly in relation to the direction of rotation from an inner edge toward the outer edge, and a second set of grooves, each groove of the second set extending obliquely backwardly toward said outer edge, from an intermediate location on a first groove between the inner and outer edges, at an angle greater, in relation to the radial direction, than the angle of the grooves of the first set.

In a second embodiment of the invention, also applicable to a disk-type friction engaging member, grooves, formed in the friction engagement surface, extend from a location spaced inwardly from the outer edge toward the outer edge, and increase in width toward the outer edge. Preferably, the grooves are spaced from an inner edge and extend to said outer edge.

In the preferred form of the second embodiment of the invention, the disk-type member is adapted to rotate in a particular direction of rotation when installed, the widths of said grooves increase gradually, and the grooves extend both outwardly, and obliquely backwardly in relation to the direction of rotation.

An embodiment of the invention applicable to band-like, wet-type friction members, grooves are formed in the friction engagement surface, and extend from intermediate locations between the side edges of the friction engagement surface toward one or both side edge and increasing in width toward the side edges. Preferably, the grooves gradually increase in width, and, as they extend toward the side edge, they extend obliquely backwardly in relation to the direction of rotation of the mating member.

The grooves described above function to remove the oil film between the friction member and the mating member, thereby making it possible to obtain a high friction coefficient substantially immediately upon engagement of the two members. Accordingly, the presence of the grooves decreases the time required for complete engagement of the two members.

It has also been determined, by testing, that the friction member in accordance with the invention has the characteristic that the coefficient of friction is high when the relative rotational speed of the friction member and the mating member is high and a surface pressure is low in the initial period of engagement, and the coefficient of friction decreases with the gradual decrease of the relative rotational speed. Consequently, there is no sudden increase in the coefficient of friction at the time engagement is completed, and therefore "shift shock" is reduced.

Further objects, details and advantages of the invention will be apparent from the following detailed description, when read in conjunction with the drawings.

DETAILED DESCRIPTION

Figure 9:
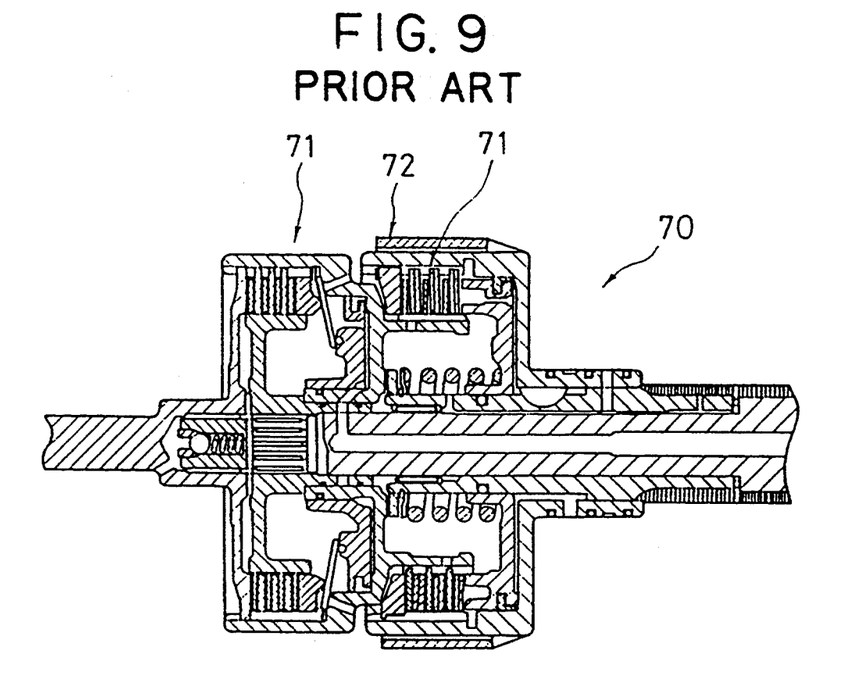
FIG. 9 is a partial axial sectional of an automotive automatic transmission.
Figure 10:
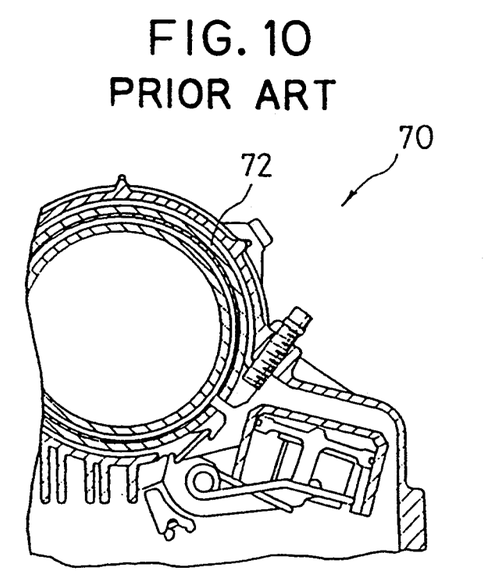
FIG. 10 is a partial radial sectional showing a band brake in the transmission of FIG. 9.
Figure 11:
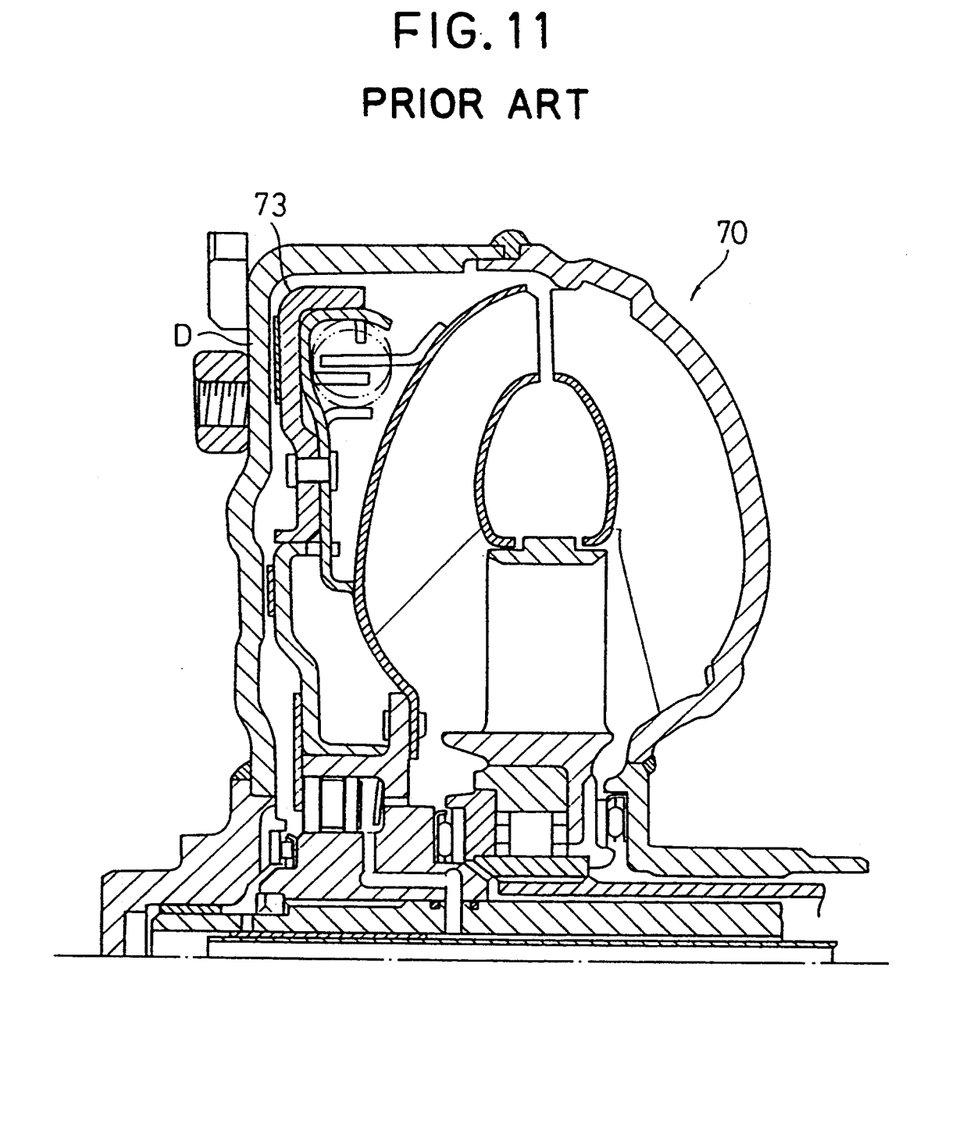
FIG. 11 is a partial axial section showing a lockup mechanism in an automotive automatic transmission.

Referring to FIGS. 9-11, the friction engaging members ordinarily present in an automatic transmission 70 are a multiple disk clutch 71, a brake band 72 and a lockup mechanism 73.

Figure 12:
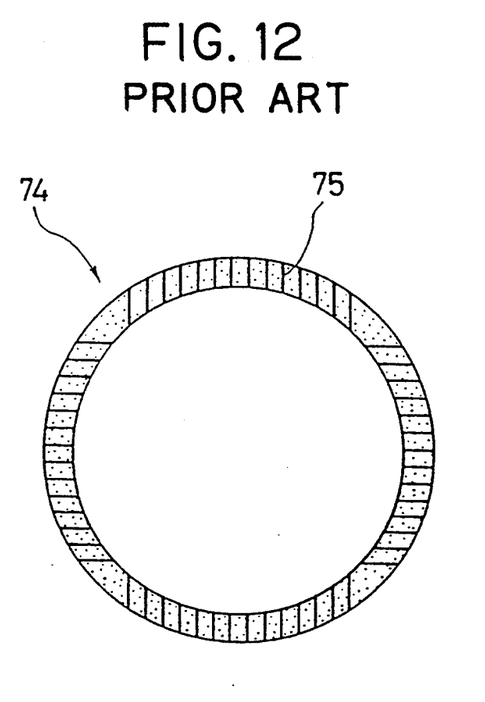
FIG. 12 is a plan view of a conventional clutch plate.

FIG. 12 shows a conventional friction member 74 used in the multiple disk clutch 71. In the friction engagement surface of the friction member 74, a number of radial grooves 75 are formed.

Figure 13:
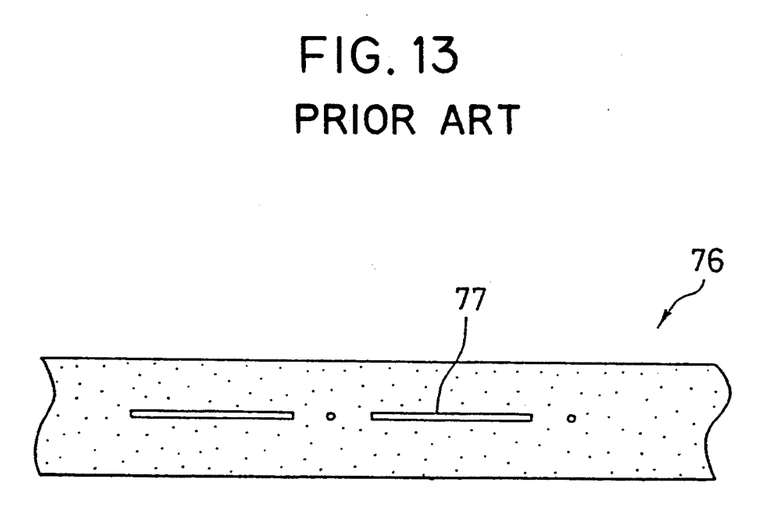
FIG. 13 is a development of a portion of a conventional brake band.

FIG. 13 shows a friction member 76 of the brake band 72. In the friction engagement surface of member 76, grooves 77 are provided. These grooves extend in the circumferential direction, i.e. in the longitudinal direction in FIG. 13, which is a development view.

The grooves in the conventional friction members are intended to remove the oil film present between the friction members and their mating members. However, the conventional grooves have a very limited ability to remove the oil film. Consequently, in the conventional transmission utilizing conventional friction members, the presence of the oil film at the time of initial engagement results in a lowered coefficient of friction, and decreases the transmission torque so that the time required for completion of engagement of the friction members is prolonged.

Figure 1:
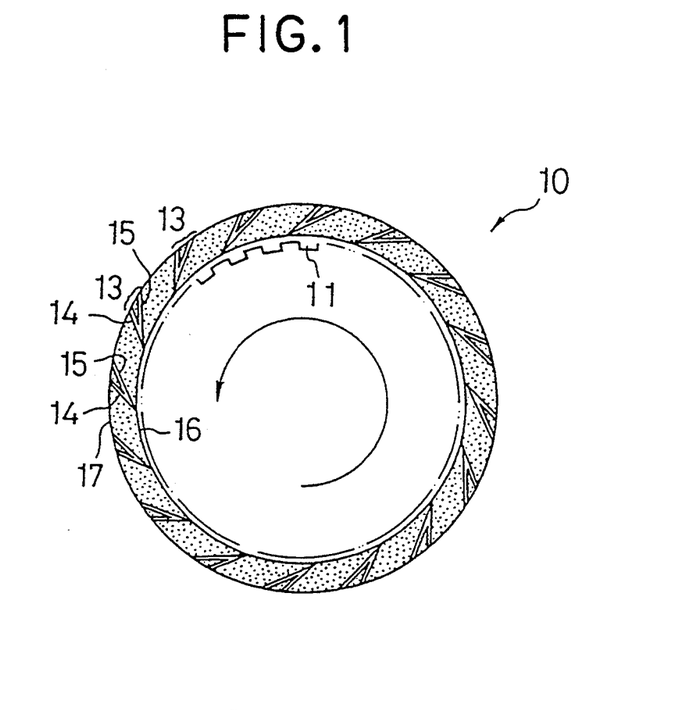
FIG. 1 is a plan view of a friction member according to a first embodiment of the invention.

In the embodiment of FIG. 1, a friction member 10 is one of plural disk type friction members used in a multiple disk clutch. The friction member 10 is securely attached to a core plate 11. Sets of grooves, each set being generally indicated by reference numeral 13, are formed in the friction engagement surface of member 10.

In the drawing, the arrow indicates the direction of rotation of the core plate 11, to which the friction member is attached. Each set of grooves 13 consists of a first groove 14 and a second groove 15, both grooves being disposed in a radial plane. The first groove 14 is formed so as to extend across the friction engagement surface from a circular inner edge 16 toward a circular outer edge 17. Groove 14 is inclined obliquely backwardly with respect to the direction of rotation. That is, the circumferential position of the outer end of the groove is behind the circumferential position of the inner end of the groove with reference to the direction of rotation of the friction member. The second groove 15 branches off from the first groove 14 at an intermediate location between the inner and outer edges of the friction surface, and similarly extends toward the outer edge 17. This second groove 15 is also inclined obliquely backwardly in relation to the direction of rotation as in the case of the first groove 14. However, the angle of groove 15 relative to the radial direction is greater than the angle of groove 14, so that the two grooves diverge from each other as they approach the outer edge 17. Each groove of the first groove 14 and the second groove 15 is of a constant width through its entire length. These grooves 14 and 15, however, may be so formed as to increase gradually in width, proceeding toward the outer edge 17 of the friction surface.

Figure 2:
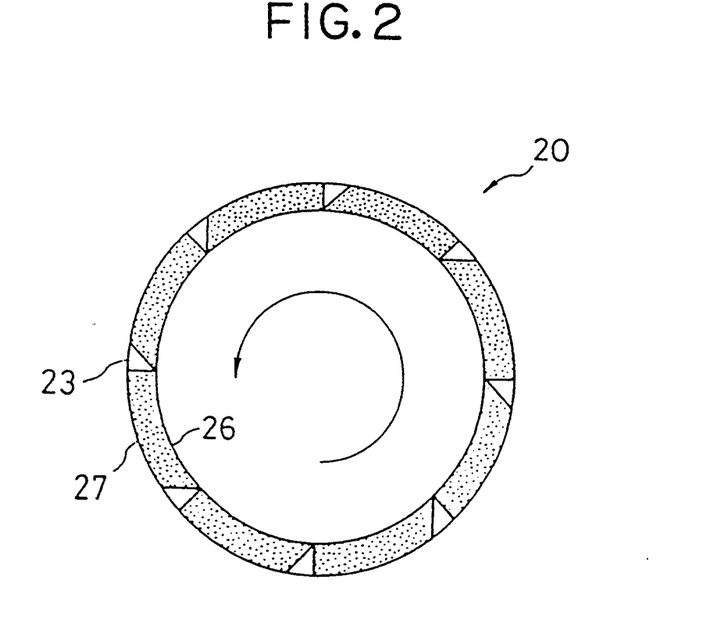
FIG. 2 is a plan view of a friction member according to a second embodiment of the invention.

In the second embodiment, as shown in FIG. 2, a friction member 20 is of the same general type as shown in FIG. 1, and is secured to a core plate (not shown) and utilized in a multiple disk clutch. In its friction engagement surface, member 20 has grooves 23, which are disposed in a radial plane and are equally spaced from one another in the circumferential direction. Each groove gradually widens, proceeding from the inner edge 26 toward the outer edge 27 of the friction surface. Furthermore, the grooves 23 are formed so that they extend obliquely backwardly in relation to the direction of rotation of the frictional member 20. That is, the centerline of each groove, extends obliquely backwardly.

Figure 3:
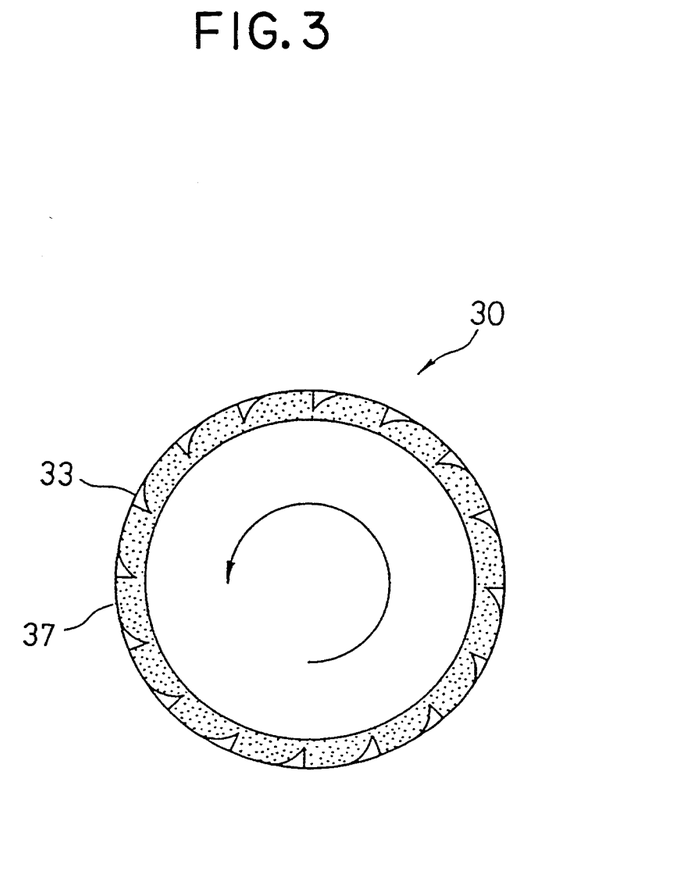
FIG. 3 is a plan view of a friction member according to a third embodiment of the invention, which consists of parts 4(a) and 4(b)

In the embodiment shown in FIG. 3, a friction member 30, is of the type utilized either in a multiple disk clutch or in the lockup mechanism of an automatic transmission. Friction member 30 is securely attached to a core plate (not shown) and has, in its friction engagement surface, a series of grooves 33 circumferentially spaced from each other uniformly and extending from an intermediate location between the inner and outer edges of the friction surface to the outer edge 37. The widths of the grooves increases in the direction approaching outer edge 37. Furthermore, the shape of the grooves is such that they extend obliquely backwardly in relation to the direction of the friction member 30.

When the friction member 30 of FIG. 3 is utilized in the lockup mechanism shown in FIG. 11, oil flow in the radial direction is interrupted when the friction member is engaged with drum D. Since grooves 33 are not connected with the inner edge of the friction surface the oil passage between the friction surface and the drum is closed. This prevents the oil pressure in the transmission from dropping when the friction surface engages the drum.

Figure 4A:
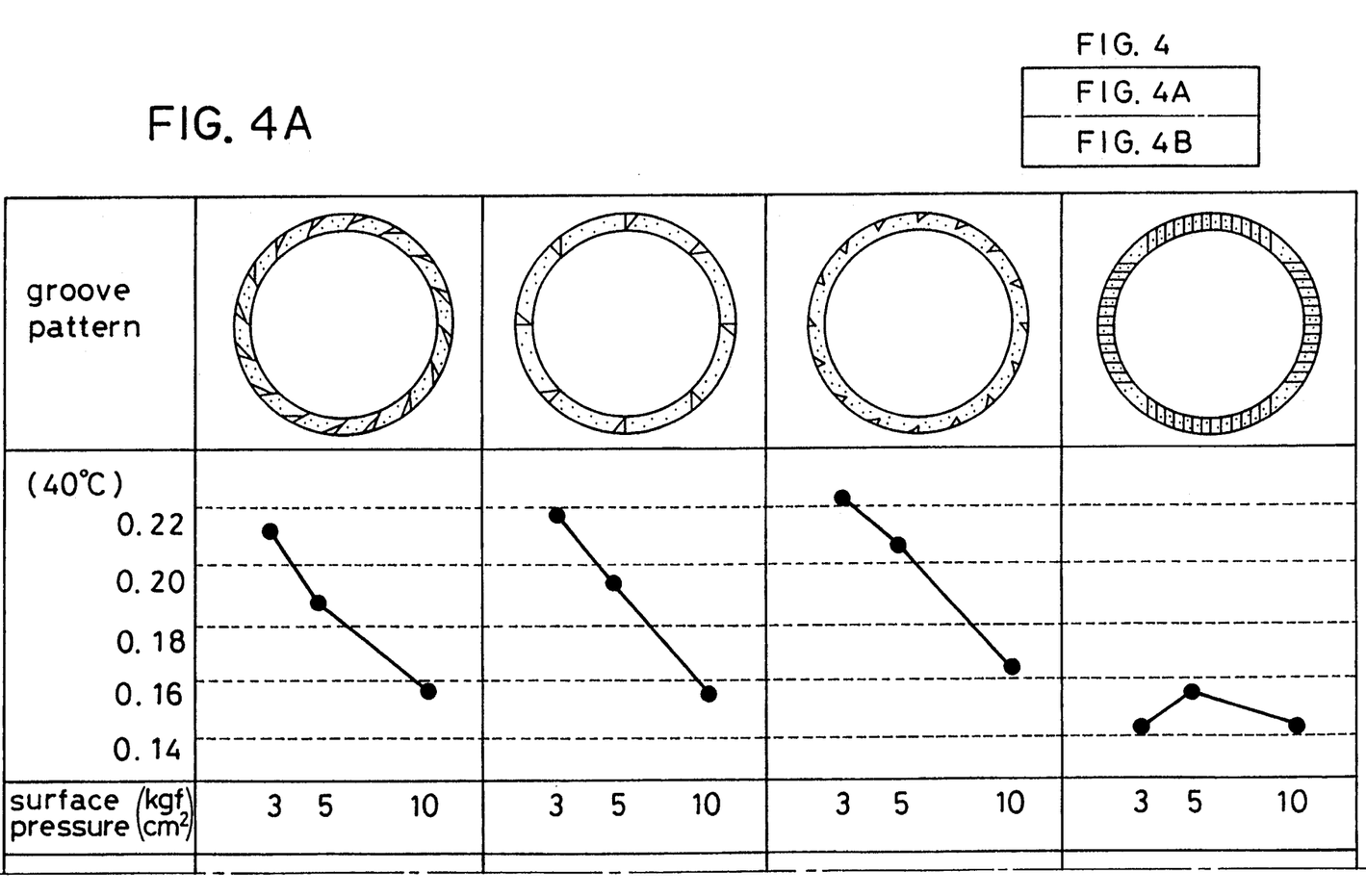
FIG. 4 is a graph comparing the a coefficients of dynamic friction and the friction characteristics for the friction engagement members of FIGS. 1 to 3 and a conventional friction member.
Figure 4B:
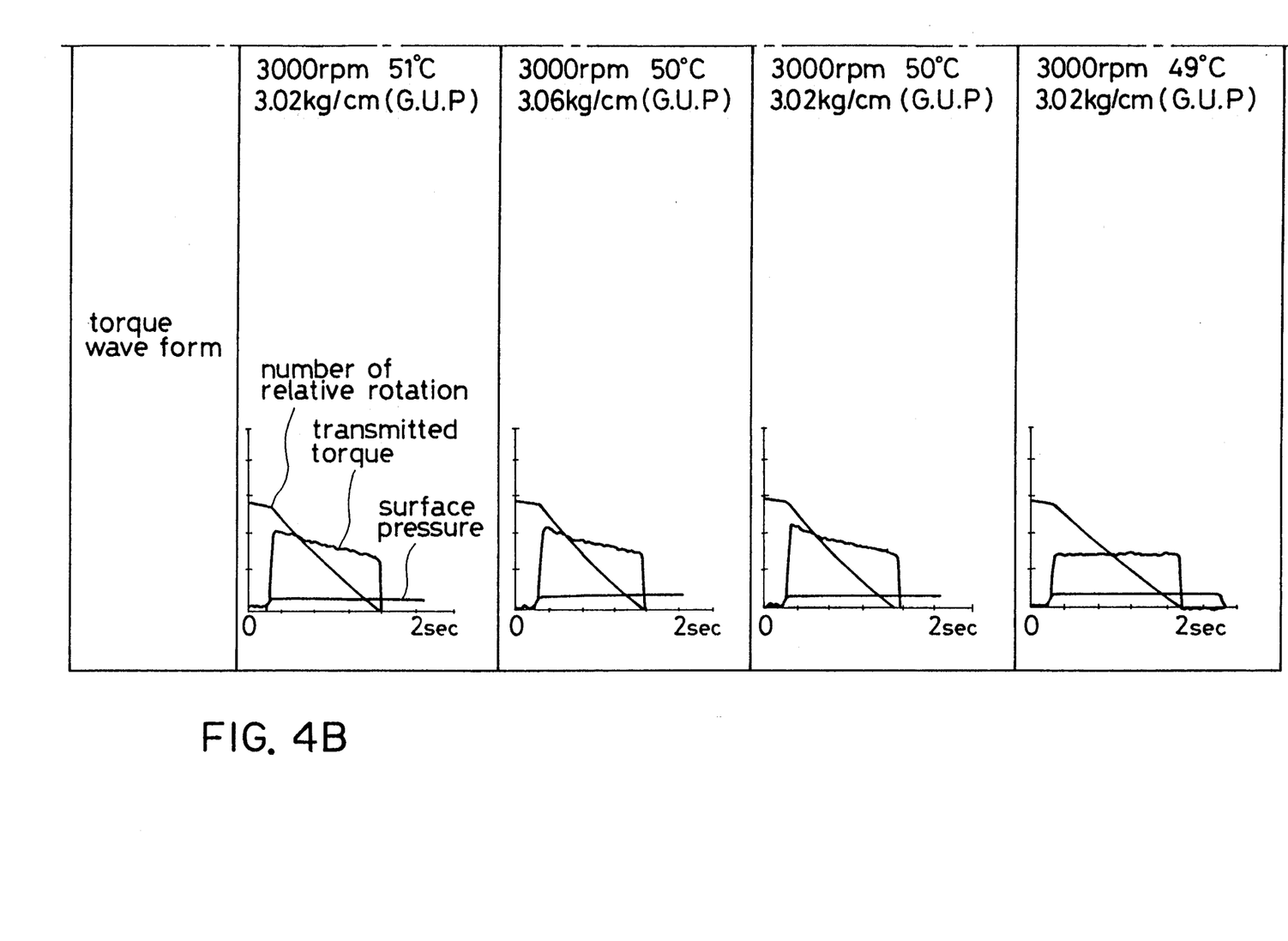

Comparison tests were conducted on a conventional friction member and on the friction members of the above-described embodiments of the invention, to obtain the coefficient of dynamic friction $\mu i$ at various surface pressures and to obtain torque waveforms at the time of frictional engagement. The results are shown in FIG. 4a and 4b. From the tests the following has been ascertained.

First, the friction members 10, 20 and 30 of the invention have a remarkably high coefficient of dynamic friction $\mu i$ in comparison with compared with the coefficient of dynamic friction of the conventional friction member of FIG. 12, particularly at low surface pressures.

Second, referring to the bottom of FIG. 4b, the torque waveforms at a relatively low surface pressure show that, with the groove patterns of FIGS. 1, 2 and 3, the transmission torque is high during the initial period of frictional engagement, and decreases with a gradual decrease in relative speed. In contrast, with the conventional friction engaging element of FIG. 12, the transmission torque does not decrease. The favorable characteristics of the friction members of the invention, as depicted in FIG. 4a and 4b, result of early removal of the oil film, achieved by virtue of the grooves in the above-described shapes.

Figure 5:
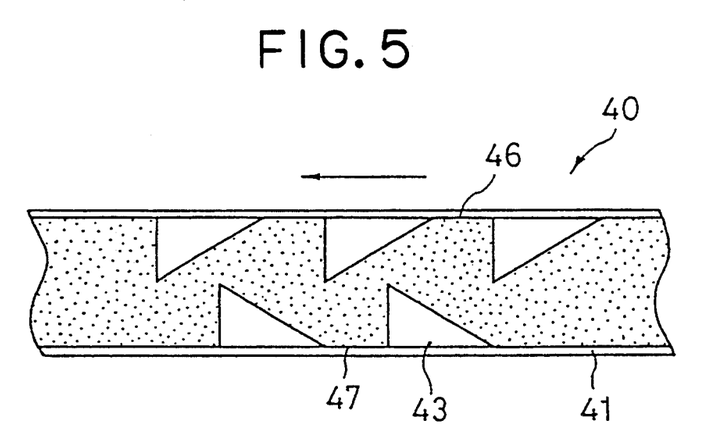
FIG. 5 is a development of a portion of a band-type friction member according to a fourth embodiment of the invention.

In the embodiment of the invention depicted in FIG. 5, friction member 40 is a band-like member fixedly attached to a lining 41. Grooves 43 are formed in the friction engagement surface.

In FIG. 5, the arrow indicates the direction of rotation of the mating member which is ordinarily a drum which cooperates with the brake band. The grooves 43 are so formed as to increase in width as they approach the side edges 46 and 47 from the center of the friction engagement surface. The grooves also extend obliquely backwardly in relation of the direction of rotation of the mating member. That is, the centerlines of the grooves extend obliquely backwardly. Preferably, the grooves communicating with one side edge 46 and the grooves communicating with the other side section 47 are shifted in phase from each other, i.e. the series of grooves on one side of the friction surface is circumferentially shifted in relation to the series of grooves on the opposite side. This insures that there are grooves adjacent to all areas of the friction surface for the removal of the oil film from all parts of the surface.

Figure 6:
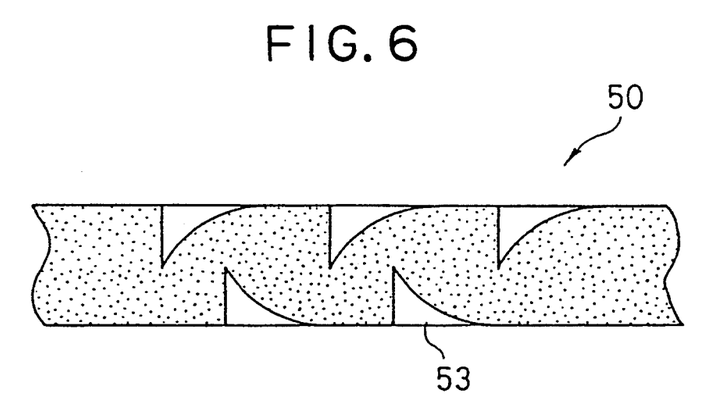
FIG. 6 is a development of a portion of a band-type friction member according to a fifth embodiment of the invention.

In the fifth embodiment, as shown in FIG. 6, a friction member 50 is similar to that of the fourth embodiment shown in FIG. 5, except that the rearward edges of the grooves 53 are defined by a convex, preferably circular, boundary.

Figure 7:
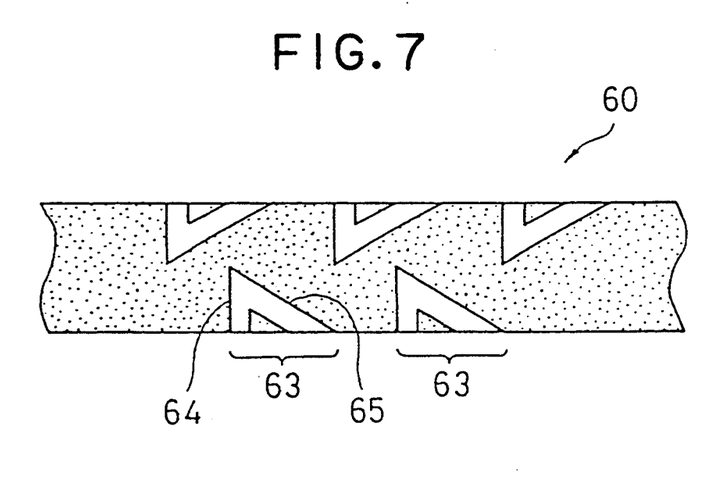
FIG. 7 is a development of a portion of a band-type friction member according to a sixth embodiment of the invention.

In the sixth embodiment, as illustrated in FIG. 7, Each set 63 of grooves on the friction surface of member 60 consists of a first groove 64 extending at a right angles to the edges of the friction surface and a second groove 65 extending obliquely backwardly in relation to the direction of rotation of the mating member.

Figure 8A:
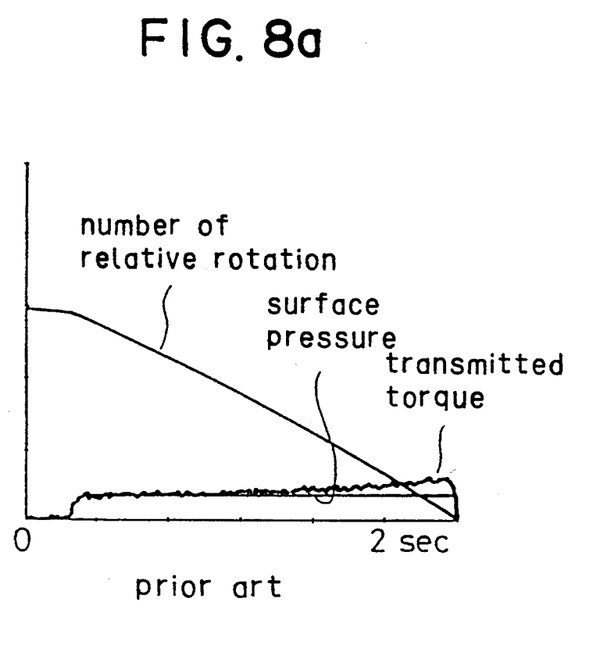
FIGS. 8(a) and 8(b) are graphs comparing the friction characteristics of the band-type friction member of FIG. with those of a conventional band-type friction member.
Figure 8B:
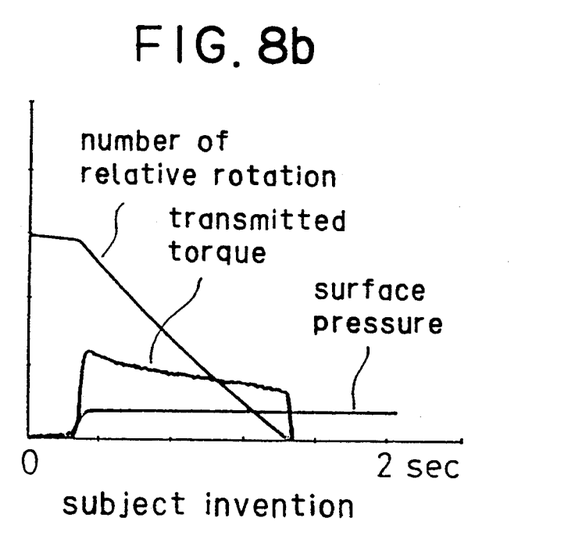

Comparison tests were carried out on the friction member 40 of FIG. 5, and the friction member of the prior art, as shown in FIG. 13, both being used in the band brake of an automatic transmission. In the tests, a torque waveform was obtained for frictional engagement of the band brakes with a drum. The results are shown in FIGS. 8(a) and 8(b), in which it is seen that friction member 40 provides a greater transmission torque at the time of frictional engagement, and that torque achieved by member 40 is remarkably greater than that achieved by the conventional friction member, particularly during the initial period of engagement. Because of the greater torque, it is possible to reduce the time required for completion of engagement. At the same time there is the tendency for the coefficient of friction to decrease gradually with a decrease in the rotational speed of the drum. Consequently, "shift shock" occurring, at the time of completion of engagement is reduced.

The invention described above facilitates removal of the oil film from a friction engagement surface and provides a high coefficient of friction during the initial period of frictional engagement, even when the surface pressure is low, thereby shortening the time required for completion of frictional engagement. As shown by the test results, the transmission torque tends to decrease gradually as the relative speed decreases, thereby reducing shift shock at the time of completion of engagement.

We claim:

1. A friction engaging element comprising a wet-type friction member having a center and means for rotating said friction member in a first direction about an axis of rotation extending through said center, and having a disk-like friction engagement surface with an inner edge and an outer edge, and grooves formed in said friction engagement surface, said grooves including a first set of grooves and a second set of grooves, each groove of the first set having an inner end and an outer end, and extending from said inner edge toward said outer edge in a second direction opposite to said first direction at a first angle measured relative to a first imaginary radius passing through said center and the inner end of the groove, and each groove of the second set extending obliquely toward said outer edge, in a second direction opposite to said first direction, from an intermediate location on a first groove between said inner and outer edges, at a second angle, measured in relation to a second imaginary radius passing through said center and said intermediate location, said second angle being greater than the first angle of the last-mentioned groove of the first set.

2. A wet-type friction member, for use in a friction engaging element, said member having a center and a disk-like friction engagement surface with an outer edge, and circumferentially spaced grooves formed in said friction engagement surface and extending from locations spaced inwardly from said outer edge toward said outer edge, the disk-like friction engagement surface being devoid of grooves between each of said locations and said center, and each of said grooves continuously increasing in width toward said outer edge over its entire extent.

3. A wet-type friction member according to claim 2, wherein the disk-like friction engagement surface has an inner edge and in which said grooves are spaced from said inner edge and extend to said outer edge.

4. A wet-type friction member according to claim 2 in combination with means for rotating said friction member in a first direction, wherein the widths of said grooves increase gradually, and wherein said grooves extend both outwardly, and obliquely in a second direction opposite to said first direction.

5. A wet-type friction member according to claim 3 in combination with means for rotating said friction member in a first direction, wherein the widths of said grooves increase gradually, and wherein said grooves extend both outwardly, and obliquely in a second direction opposite to said first direction.

6. A wet-type friction member for use in a friction engaging element, said member comprising a band having a friction engagement surface with side edges, and grooves formed in said friction engagement surface, each of said grooves being bounded by an inner end at an intermediate location between said side edges, extending from said intermediate location toward one of said side edges, and continuously increasing in width from said inner end toward said one side edge.

7. A wet-type friction member according to claim 6 in combination with a mating member and means for rotating said mating member in a first direction relative to said band, wherein said friction engagement surface is in engagement with said mating member, and wherein said grooves gradually increase in width, and, as they extend toward said side edge, extend obliquely in a second direction opposite to said first direction.

* * * * *